(12) United States Patent
Wilson

(10) Patent No.: US 12,266,048 B2
(45) Date of Patent: Apr. 1, 2025

(54) COMPUTER-IMPLEMENTED VIDEO CONFERENCE APPLICATION THAT IS CONFIGURED TO TRANSITION BETWEEN 2D AND 3D VIEWS

(71) Applicant: Microsoft Technology Licensing, LLC, Redmond, WA (US)

(72) Inventor: Andrew D. Wilson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 17/692,143

(22) Filed: Mar. 10, 2022

(65) Prior Publication Data

US 2023/0290041 A1  Sep. 14, 2023

(51) Int. Cl.
  *G06T 15/20* (2011.01)
  *G06T 7/70* (2017.01)
  *H04L 65/403* (2022.01)

(52) U.S. Cl.
  CPC .............. *G06T 15/20* (2013.01); *G06T 7/70* (2017.01); *H04L 65/403* (2013.01); *G06T 2207/20092* (2013.01)

(58) Field of Classification Search
  None
  See application file for complete search history.

(56) References Cited

U.S. PATENT DOCUMENTS

| | | | | |
|---|---|---|---|---|
| 2010/0026712 A1* | 2/2010 | Aliprandi | ............... | G06T 15/20 345/629 |
| 2011/0018868 A1* | 1/2011 | Inoue | .................. | H04N 13/279 345/419 |
| 2013/0321257 A1* | 12/2013 | Moore | ............... | G01C 21/3664 345/156 |
| 2013/0321395 A1 | 12/2013 | Chen et al. | | |
| 2013/0322634 A1 | 12/2013 | Bennett et al. | | |
| 2013/0322702 A1* | 12/2013 | Piemonte | ................ | G06T 19/20 382/113 |
| 2016/0227172 A1 | 8/2016 | Safaei et al. | | |
| 2016/0358383 A1* | 12/2016 | Gauglitz | ............... | G06F 3/0304 |

(Continued)

OTHER PUBLICATIONS

Zheng, K. C., Colburn, A., Agarwala, A., Agrawala, M., Salesin, D., Curless, B., & Cohen, M. F. (2009). Parallax photography: creating 3d cinematic effects from stills. In Proceedings of Graphics Interface 2009 (pp. 111-118).*

(Continued)

*Primary Examiner* — Sultana M Zalalee
(74) *Attorney, Agent, or Firm* — Calfee, Halter & Griswold LLP

(57) ABSTRACT

Technologies for transitioning between two-dimensional (2D) and three-dimensional (3D) display views for video conferencing are described herein. Video conferencing applications can have multiple display views for a user participating in a video conference. In certain situations a user may want to transition from a 2D display view of the video conference to a more immersive 3D display view. These transitions can be visually jarring and create an uncomfortable user experience. The transition from a 2D display view to a 3D display view can be improved by executing the transition to a 3D display view by manipulating visual properties of a virtual camera that is employed to generate the display views.

20 Claims, 7 Drawing Sheets

(56) References Cited

U.S. PATENT DOCUMENTS

2018/0095649 A1    4/2018  Valdivia et al.
2019/0058870 A1*   2/2019  Rowell ............... H04N 13/189
2022/0021845 A1    1/2022  Schneider

OTHER PUBLICATIONS

"International Search Report and Written Opinion Issued in PCT Application No. PCT/US2023/012064", Mailed Date: May 9, 2023, 13 Pages.

* cited by examiner

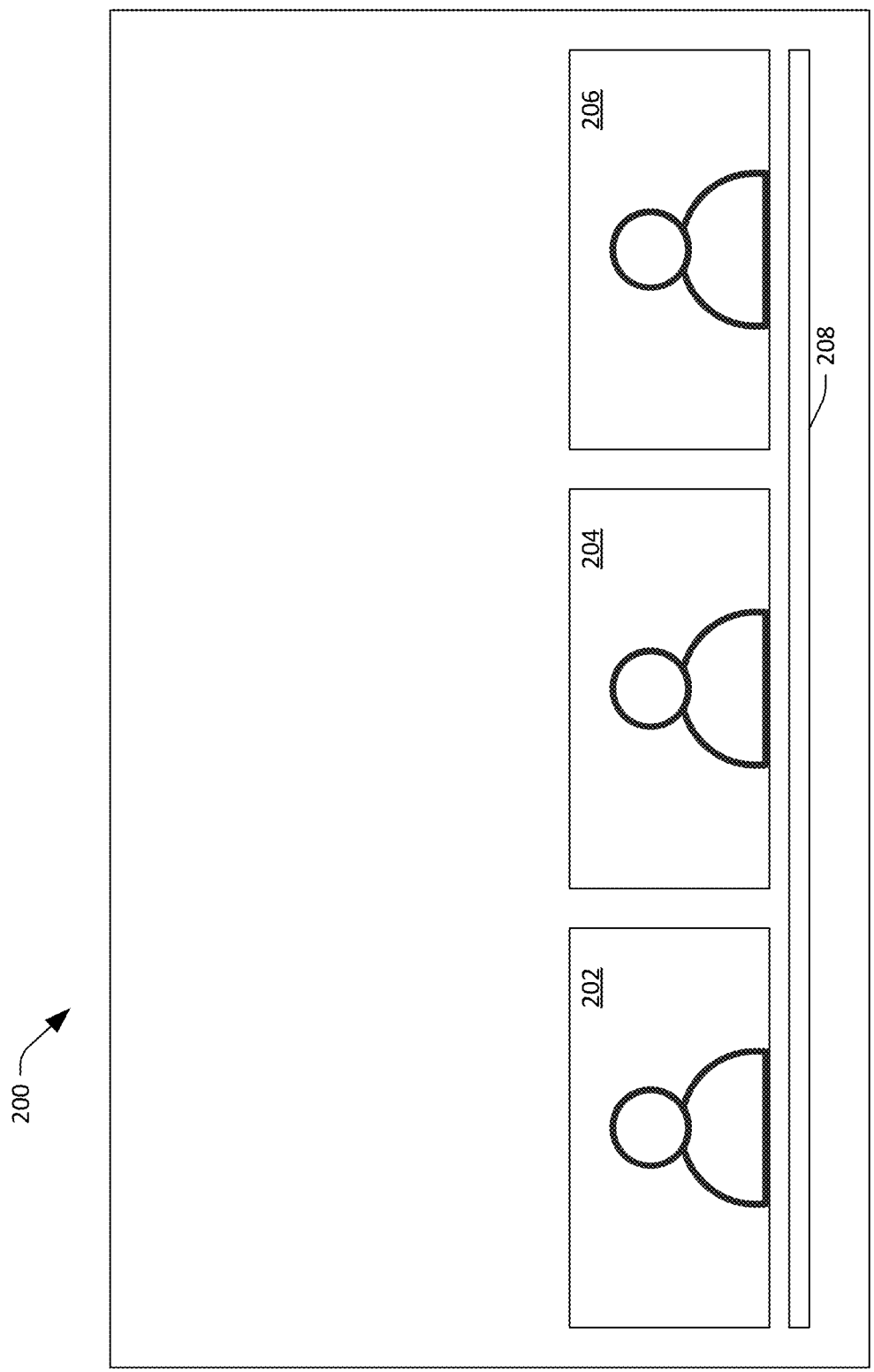

US 12,266,048 B2

COMPUTER-IMPLEMENTED VIDEO CONFERENCE APPLICATION THAT IS CONFIGURED TO TRANSITION BETWEEN 2D AND 3D VIEWS

BACKGROUND

A conventional computer-implemented video conference application is used to connect remote users for participating in a video conference when an in-person meeting is unavailable or impractical, wherein participants log into a meeting and participate in the meeting over a video stream. With respect to a video conference being participated in by a user, the conventional video conference application represents other participants as graphical representations on a display of the user, where the graphical representations can be video tiles depicting videos of the other participants, pictures of the other participants, names of the other participants, etc. As video conferencing has become more widely adopted as a replacement for in-person meetings, more immersive techniques have been employed when representing video conference participants on a display. Some of these techniques have involved constructing computer-implemented three-dimensional (3D) environments in which the video conference is conducted. Thus, the conventional video conference application can display, to a meeting participant, graphical representations of other meetings participants in a 3D environment in an attempt to more closely mimic a traditional in-person meeting.

In a conventional video conference application that provides both a two-dimensional (2D) tile view and a 3D view, a graphical user interface (GUI) of the application includes a selectable interactive element (e.g., a graphical button) that facilitates toggling between the two views. Specifically, when the GUI of the video conference application is presenting a 3D view to a user participating in an online meeting and the application receives an indication that the selectable interactive element has been selected by the user, the application immediately updates the GUI to present a 2D view to the user. Likewise, when the GUI of the video conference application is presenting a 2D view to a user participating in an online meeting and the application receives an indication that the selectable interactive element has been selected by the user, the application immediately updates the GUI to present a 3D view to the user. The sudden updating of the GUI between the 2D and 3D views may cause a graphical representation of a meeting participant to "jump" from a first position on a screen to a second position on the screen; when there are a relatively large number of meeting participants, positions of several graphical representations of several meeting participants may suddenly change. Thus, the conventional video conference application has been observed to cause confusion amongst meeting participants when the application transitions between 2D and 3D views.

SUMMARY

The following is a brief summary of subject matter that is described in greater detail herein. This summary is not intended to be limiting as to the scope of the claims.

Described herein are various technologies related to a computer-implemented video conference application (which may also be referred to as an online meeting application, a unified communications application, or similar titles) that is configured to smoothly transition between a 2D view and a 3D view, such that graphical representations of meeting participants do not "jump" from one location on a display to another or immediately change size on the display. In an example, an online meeting is conducted through use of the video conference application, where the online meeting includes several participants, and where the participants include a user who is employing a client computing device to participate in the meeting. The video conference application (which can be a distributed application) can present a 2D view of the meeting on a display that corresponds to the client computing device, where the 2D view includes an arrangement of 2D representations of meeting participants (such as video tiles) on the display (with each tile representing a meeting participant). In an example, the online meeting includes four participants (including the user), and thus the video conference application presents three 2D representations of the participants on the display of the user.

The video conference application can additionally support a 3D view, where rather than the graphical representations of the three other participants being presented in two dimensions, the online meeting is rendered by the video application in 3D, such that the online meeting presented on the display includes 3D features. In an example, the video conference application can employ a rendering technique by generating imagery of a 3D environment from the perspective of a virtual camera that is capturing imagery of the 3D environment. Thus, the graphical representations of the meeting participants that were displayed in 2D include 3D features in the 3D view, where the 3D features comprise depth, perspective, and the like.

The video conference application is additionally configured to smoothly transition from the 2D view to the 3D view (and vice versa). In an exemplary embodiment, the transition can be performed through manipulation of the focal length and position of the virtual camera referenced above. With more particularity, upon the video conference application receiving an indication from the user that the view is to transition from the 2D view to the 3D view, the graphical representations of the meeting participants is placed in a 3D environment (e.g., assigned positional and size data in the 3D environment). Additionally, the virtual camera is placed at a first position with respect to the graphical representations in the 3D environment, such that the virtual camera is at a first distance from a predefined point in the 3D environment and the predefined point is at a center of a field of view (FOV) of the virtual camera. The predefined point can be a center of the 3D environment, a center of a graphical representation of a meeting participant that is proximate to the center of the 3D environment, etc. The virtual camera is additionally assigned a first focal length, which can be the first distance. When the virtual camera is at the first position and has the first focal length, the video conference application renders the 3D as captured by the virtual camera, and the 3D environment is depicted in 2D on the display.

The video conference application transitions from the 2D view to a 3D view by simultaneously changing both the position and the focal length of the virtual camera, and rendering the 3D scene as the focal length and the position of the virtual camera change. Put differently, the video conference application can employ the dolly-zoom camera technique when transitioning from the 2D view to the 3D view. In an example, when transitioning from the 2D view to the 3D view, the video conference application moves the virtual camera vertically (upwards) in the 3D environment while the predefined point remains in a center of the FOV of the virtual camera. The video conference application can optionally also move the virtual camera laterally in the 3D environment simultaneously with moving the virtual camera vertically. Thus, the distance between the virtual camera and the predefined point referenced above increases while the predefined point remains at a center of the FOV of the virtual camera. While the video conference application moves the virtual camera, the video conference application simultaneously updates the focal length of the virtual camera such that the focal length remains equal to the distance between the virtual camera and the predefined point. The result is a smooth transition from the 2D view to a 3D view, where position and size of a graphical element (such as a graphical representation of a meeting participant) at a center of the FOV of the virtual camera remains static on the display during the transition while other graphics in the scene smoothly change position on the display and exhibit 3D features. The amount of change of the virtual camera position is definable by the user, such that a 3D view can be "more" or "less" 3D, per the desires of the user. In addition, the video conference application can smoothly transition from a 3D view to a 2D view using the technologies referenced above.

The technologies described herein exhibit various advantages over conventional video conference applications. Using the technologies described herein, there is a smooth transition between a 2D view and a 3D view of an online meeting rendered by a video conference application, which is in contrast to the conventional approach where there is a jarring transition when transitioning from a 2D view to a 3D view. In addition, the improved video conference application allows for an end user to define how 3D a scene appears, for example, the end user can control positions and focal length of the virtual camera in the 3D scene, causing the scene to appear "more" or "less" 3D.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the detailed description of the illustrated embodiments, which is to be read in connection with the accompanying drawings.

BRIEF DESCRIPTION OF THE DRAWINGS

FIG. 2A illustrates an exemplary 2D display view generated by a video conference application, where a graphical object is displayed alongside the graphical representations of the participants.

DETAILED DESCRIPTION

Figure 1:
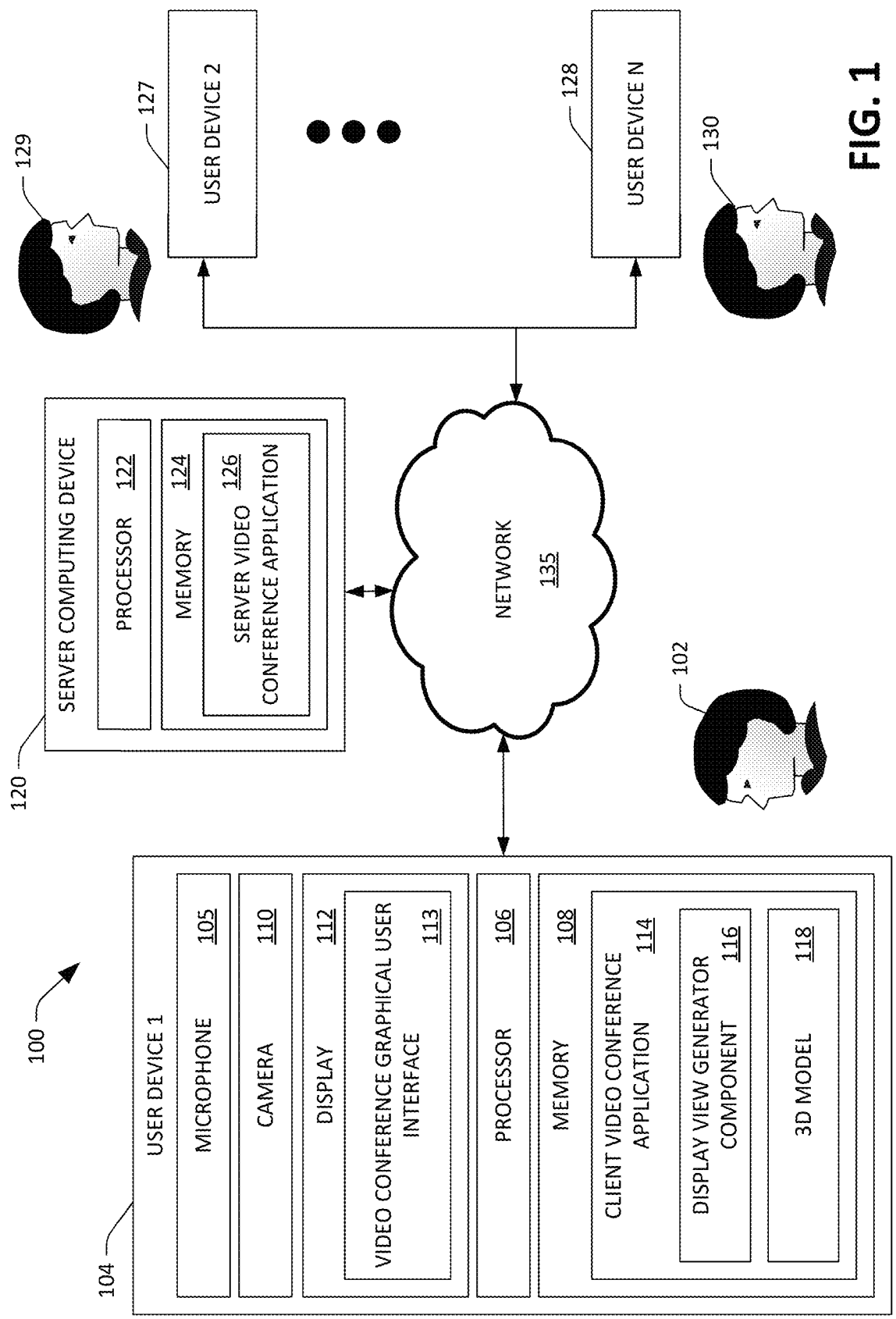
FIG. 1 illustrates an exemplary video conferencing system.

Described herein are various technologies pertaining to a computer-implemented video conference system that is configured to smoothly transition between two-dimensional (2D) and three-dimensional (3D) display views in an online meeting that includes multiple participants. The video conferencing system is used to connect a user and one or more participants in an online meeting (also referred to as a video conference). Depending on user preferences, the online meeting can be presented to a user in a 2D display view or a 3D display view, and the video conference system is configured to smoothly transition between these different display views.

As explained above, a conventional video conference application, when transitioning between a 2D and 3D display view, causes graphical representations of participants to "jump" from a first position on a display to a second position on the display; when there are a relatively large number of meeting participants, positions of several graphical representations of several meeting participants may suddenly change. Exemplary systems and methodologies described herein address this shortfall of conventional video conferencing systems by rendering a 3D environment from the perspective of a virtual graphical camera to graphically depict a smooth transition between 2D and 3D display views, where "position" and focal length of the virtual camera are manipulated in connection with rendering the smooth transition, and further wherein the transition is performed over several timestamps in order to cause such transition to appear as being "smooth".

In an exemplary embodiment, responsive to a user request to transition from a 2D display view to a 3D display view, the video conference system can manipulate the position and focal length of the virtual camera to create an effect where a graphical representation of a participant in the online meeting (e.g., at or near a center of a field of view (FOV) of the virtual camera) is held in constant size and position while the remainder of the scene gains depth and dimension. This effect smooths out the transition from a display view with 2D elements to a display view with 3D elements and vice versa. By manipulating parameters of the virtual camera, the video conferencing system is further able to control the transition to vary the amount of depth and dimension of the graphical elements of each display view so that a 3D view can be "more" or "less" three-dimensional. These aspects are described in greater detail below.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something, and is not intended to indicate a preference.

Further, as used herein, the terms "component", "system", "module", and "model" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference to FIG. 1, an exemplary video conferencing system 100 is illustrated. The conferencing system 100 may be used by a plurality of users to participate in a video conference (which, as noted above, may also be referred to herein as an online meeting). While the exemplary embodiments described herein are used in conjunction with video conferences, it is appreciated that the embodiments are readily adaptable to a wide array of video communication applications and are not limited to video conferences in any one context.

Video conferencing system 100 comprises a user device 104 and a server computing device 120 in communication with the user device 104 over a network 135. The user device 104 is operated by a user 102, and comprises a processor 106 and memory 108, where the processor 106 executes instructions stored in the memory 108, and further where the instructions, when executed by the processor 106, cause the processor 106 to perform a routine, function, or the like. As illustrated, the memory 108 has a client video conference application 114 (referred to herein as the "client application 114"), where the client application 114 can be configured to perform display view transition methodologies disclosed herein.

Client application 114 comprises a display view generator component 116 and a 3D model 118 of a virtual scene where an online meeting is conducted. The display view generator component 116 may generate a display view comprising graphical elements, where the graphical elements include graphical representations of participants in the online meeting. The graphical elements may be tiles that depict video of the participants, images of the participants, avatars that represent the participants, etc. The graphical elements may further comprise additional computer-generated elements that contextualize a video conference meeting, such as a computer-implemented representation of a conference room table, a vase, and so forth.

The user device 104 further optionally includes a microphone 105 and camera 110, where the microphone 105 detects spoken utterances set forth by the user 102 and the camera 110 captures images of the user 102. The user device 104 further comprises a display 112, where the display 112 depicts a graphical user interface (GUI) 113 of the client application 114, wherein the graphical elements referenced above are depicted in the GUI 113. It is appreciated that user device 104 may be embodied in a single device or distributed between multiple devices in operable communication with one another. For example, user device 104 may comprise one or more mobile phones, laptop or desktop computers, tablets, virtual reality headsets, augmented reality headsets, or the like configured for use with video content streaming (e.g., via client video conference application 114).

The system 100 comprises additional user devices 127-128 that are in communication with the server computing device 120 (and one another) by way of the network 135. While not illustrated, the user devices 127-128 have respective instances of the client application 114 executing thereon (e.g., in a standalone application or browser), such that users 129-130 of the user devices 127-128 can participate with the user 102 in an online meeting.

The server computing device 120 includes a processor 122 and memory 124. The memory 124 stores a server video conference application (referred to herein as "server application") that is executed by the processor 122. The server application 126 is configured to handle authentication of online meeting participants, permissions associated with an online meeting, etc. In addition, the server application 126 is configured to receive audio/video from the user devices 104 and 127-128 and stream appropriate audio/video to the user devices 104 and 127-128 in connection with facilitating the online meeting amongst the participants 102 and 129-130.

Exemplary operation of the system 100 is now set forth. The server application 126 receives a request to conduct an online meeting, where the online meeting includes participants 102 and 129-130. The server application 126 receives requests from the user devices 104 and 127-128, where the requests are for the users 102 and 129-130 to join the online meeting. The server video conference application 126 authenticates the users 102 and 129-130 and initiates the online meeting. In an exemplary embodiment, the server application 126 receives video and/or audio data from the user devices 127-128 and streams the video and/or audio data to the user device 104, whereupon the client application 114 presents at least a portion of the video and/or audio data to the user 102 by way of the display 112 and speaker (not shown). More specifically, the display view generator component 116 generates a display view for presentment in the GUI 113 on the display 112 based upon data received from the server video application 126. The display view generator component 116 can generate a 2D display view, a 3D display view, and can cause a transition between a 2D display view and a 3D display view to be presented in the GUI 113 during the online meeting. While the display view generator component 116 is depicted as being included in the client application 114, in another example the display view generator component 116 can be included in the server application 126 (such that the server video conference application 126 constructs the display view and transmits the display view to the client video conference application 114 for display on the display 112).

During the online meeting, the display view generator component 116 can receive a selection from the user 102 as to a display view that is to be depicted in the GUI 113. For example, the display view generator component 116 can initially generate a 2D display view and cause such 2D display view to be displayed in the GUI 113 during the online meeting. Subsequently, the display view generator component 116 can receive a request from the user 102 to transition the 2D display view to a 3D display view, such that a scene is rendered in 3D in the GUI 113.

In connection with transitioning between a 2D display view and a 3D display view (and vice versa), the display view generator component 116 may utilize a virtual camera to capture images of a 3D scene, and the display view generator component 116 can render such images for display in the GUI 113. Display of graphical elements in a display view are thus a function of position of the virtual camera relative to the graphical elements in the display, direction where the virtual camera is pointing, and focal length of the virtual camera. When transitioning from a 2D display view to a 3D display view, the display view generator component 116 is configured to alter the position and focal length of the virtual camera over time to cause the 2D display view to transition smoothly to the 3D display view. Examples of a 2D display view and corresponding virtual camera position and focal length and of 3D display view and corresponding virtual camera position and focal length are set forth below.

Referring now to FIG. 2A, an exemplary 2D display view 200 that can be presented in the GUI 113 on the display 112 of the user device 104 is illustrated. The 2D display view 200 illustrates that the user 102 is participating in an online meeting with three different participants; more specifically, the 2D display view 200 includes graphical elements 202, 204, and 206 that respectively represent the three other participants in the online meeting. The 2D display view 200 may also optionally comprise a graphical feature 208 that can appear to the user 102 as an aesthetic feature of the GUI 113. The graphical elements 202-206 and the graphical feature 208 are included in the 2D display view 200 as 2D elements.

The graphical elements 202-206 may include video data streamed from the server application 116, where the first graphical element 202 is a tile that includes a video feed of a first meeting participant, the second graphical element 204 is a tile that includes a video feed of a second meeting participant, etc. In another example, one or more of the graphical elements 202-206 are avatars that represent the meeting participants. In yet another example, one or more of the graphical elements are images that represent the meeting participants. Other embodiments are also contemplated. When a graphical element is an avatar, the avatar can be configured to mimic facial expression of the meeting participant represented by the avatar, where the facial expressions correspond to the participant's speech. Further, avatars may be generated at the user device 104 using one or more peripheral or integrated devices for virtual reality (VR), augmented reality (AR), holoportation, holographic visualization, or the like.

The graphical elements 202-206 and the graphical feature 208 displayed within the 2D display view 200 have positional information assigned thereto. The positional information assigned to a graphical element or feature can describe a location of the element of feature within a scene depicted in the display view 200 (where the scene can be a 2D scene or a 3D scene). The positional information assigned to the element may further optionally include information that identifies a relative distance between the graphical element and another graphical element, a relative distance between the graphical element and the graphical feature 208, etc.

Figure 2B:
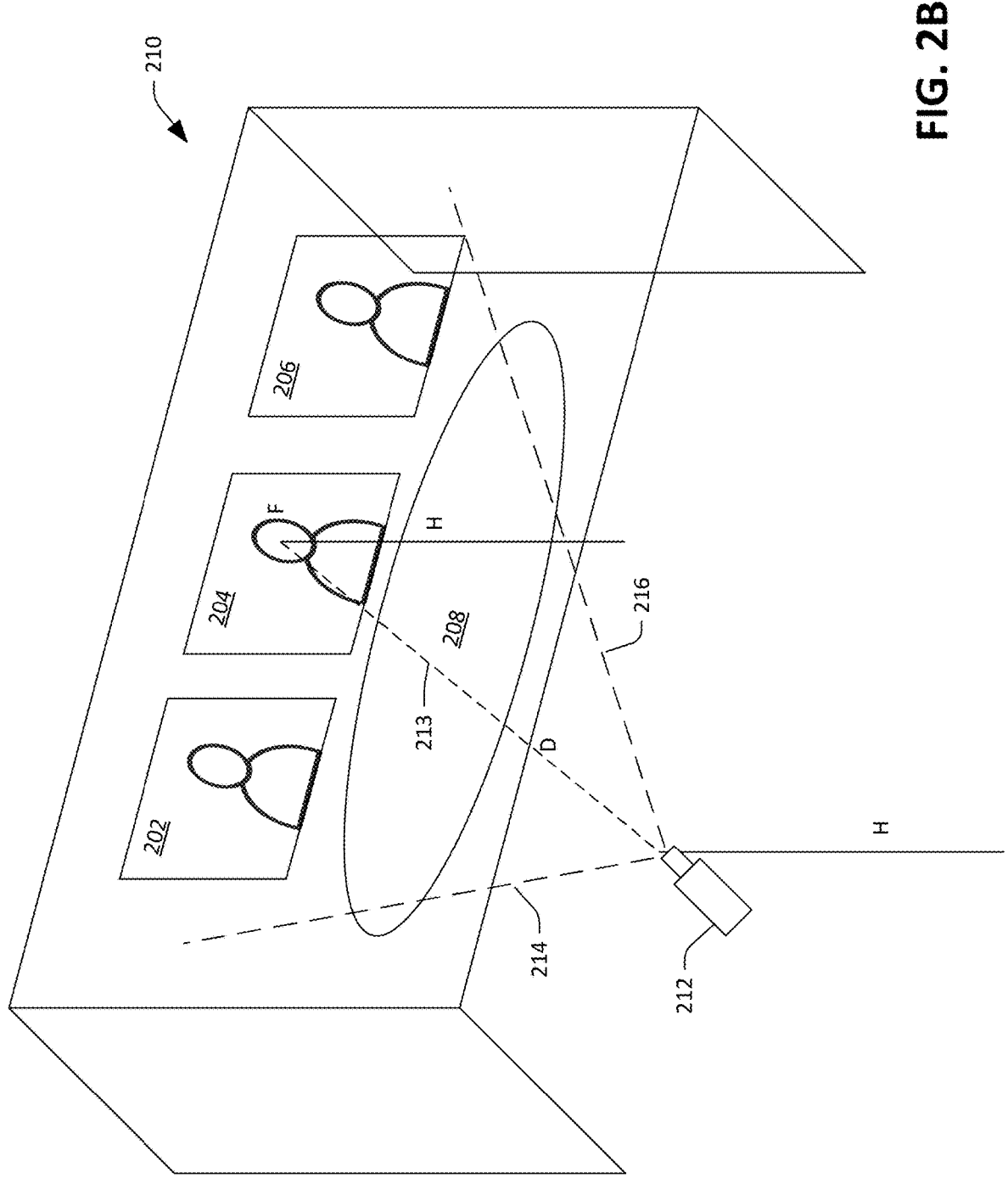
FIG. 2B illustrates a virtual camera and its position correlated to the exemplary 2D display view of FIG. 2A.

Referring now to FIG. 2B, a schematic that depicts how the 2D display view 200 may represent a 3D scene 210 is illustrated. The 3D scene 210 includes the graphical elements 202-206 positioned in a virtual room and arranged around a table (the graphical feature 208). When a virtual camera 212 is placed at a certain position relative to the graphical elements 202-206 and the graphical feature 208 in the scene 210, an image captured by the virtual camera 212 is the 2D display view 200. With more specificity, as illustrated, the virtual camera 212 is positioned at height H above ground in the scene 210, and where a focal point F of the virtual camera 212 is also at height H above ground and lies on graphical element 204. In addition, an optical axis 213 of the virtual camera 212 is orthogonal to a surface of the graphical element 204 where the optical axis 213 intersects with the graphical element 204. The focal plane of the virtual camera 212 is at distance D from the virtual camera 212, such that the graphical elements 202-206 lie within or proximate to the focal plane of the virtual camera 212. The virtual camera 212 has a FOV represented by dashed lines 214 and 216, where the field of view encompasses the graphical elements 202-206 and a portion of the graphical feature 208. Given such conditions, an image captured by virtual camera 212 appears in 2D, despite the scene 210 being three-dimensional. The display view generator component 116 generates the 2D view 200 by positioning the virtual camera 212 as illustrated in FIG. 2B relative to graphical elements in the virtual scene 210.

Figure 3A:
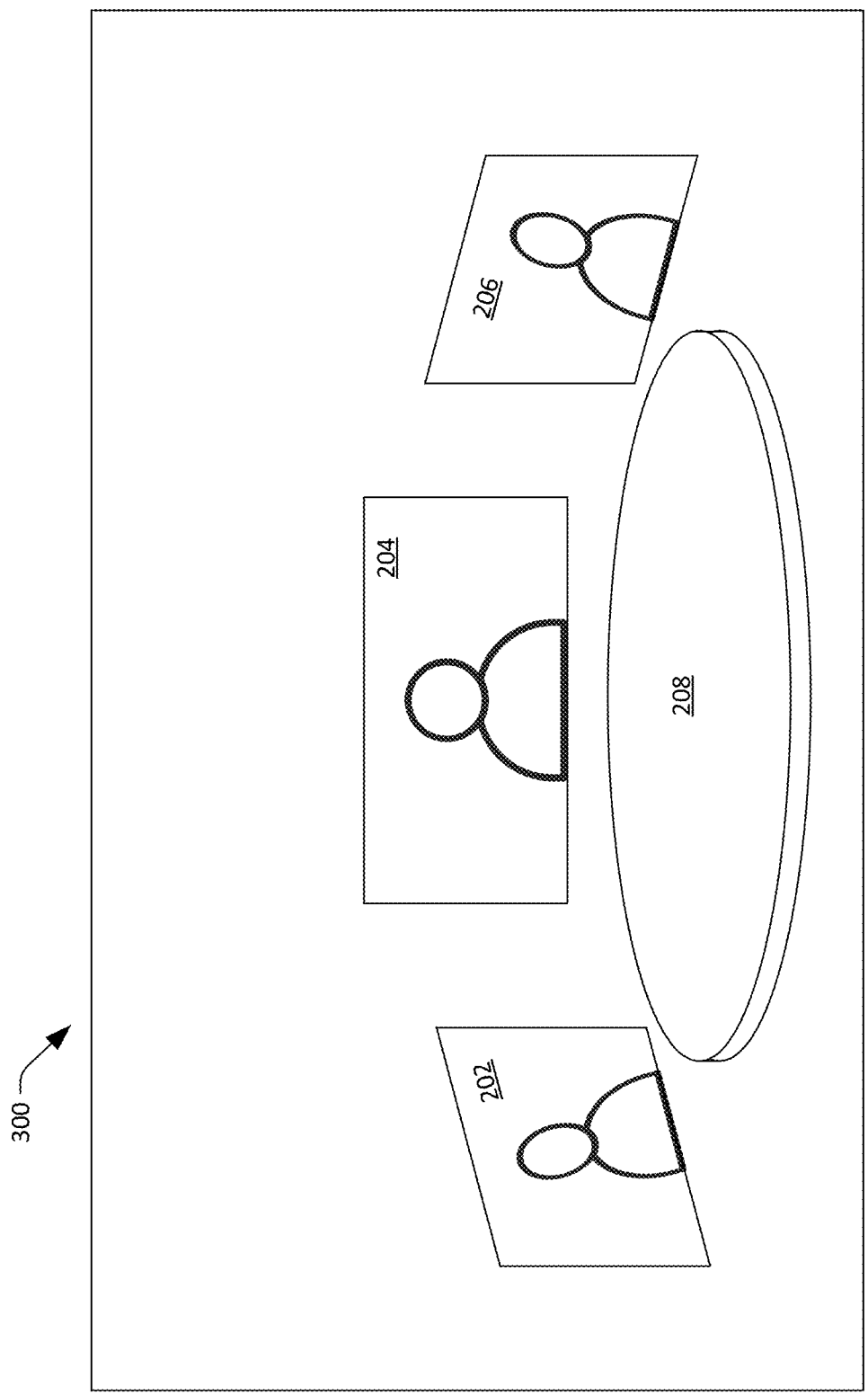
FIG. 3A illustrates an exemplary 3D display view generated by the video conference application, where the 3D display view depicts the graphical representations of the meeting participants with 3D features.

Referring now to FIG. 3A, a 3D display view 300 that can be presented in the GUI 113 on the display 112 of the user device 104 is illustrated, wherein the 3D display view 300 corresponds to the 2D display view 200 and the 3D scene 210. As with the 2D display view 200 illustrated in FIG. 2A, the 3D display view 300 includes the graphical elements 202, 204, and 206 and the graphical feature 208; however, in the 3D display view 300, at least some of the graphical elements 202, 204, and 206 have 3D features, and depth of the scene 210 is depicted in the 3D display view 300. As referenced above, the display view generator component 116 can receive a request from the user 104 to transition from the 2D display view 200 to the 3D display view 300, and the display view generator component 116 can cause such transition to be performed so that the transition from the 2D view to the 3D view occurs smoothly in the GUI 113. As will be described below, the positional information assigned to the graphical elements 202-206 and the graphical feature 208 is used by the display view generator component 116 when transitioning from the 2D view 200 to the 3D view 300.

The display view generator component 116 may utilize various techniques to transition between a 2D display view and 3D display view. For instance, the display view generator component 116 uses "billboarding" to adjust the orientation of each participant to focus on a point within the 3D environment, such as the center of the scene 210 and/or content being displayed in the scene 210 as part of an online meeting. Further, the display view generator component 116 can provide depth and dimension to one or more of the graphical elements 202-206. Depth and dimension can be added to an element by modifying the appearance of the element. Further, the display view generator component can use an orthographic projection to render a graphical element in 3D. These same techniques may be applied to background reference images or the 3D objects rendered as part of the 3D display view.

Figure 3B:
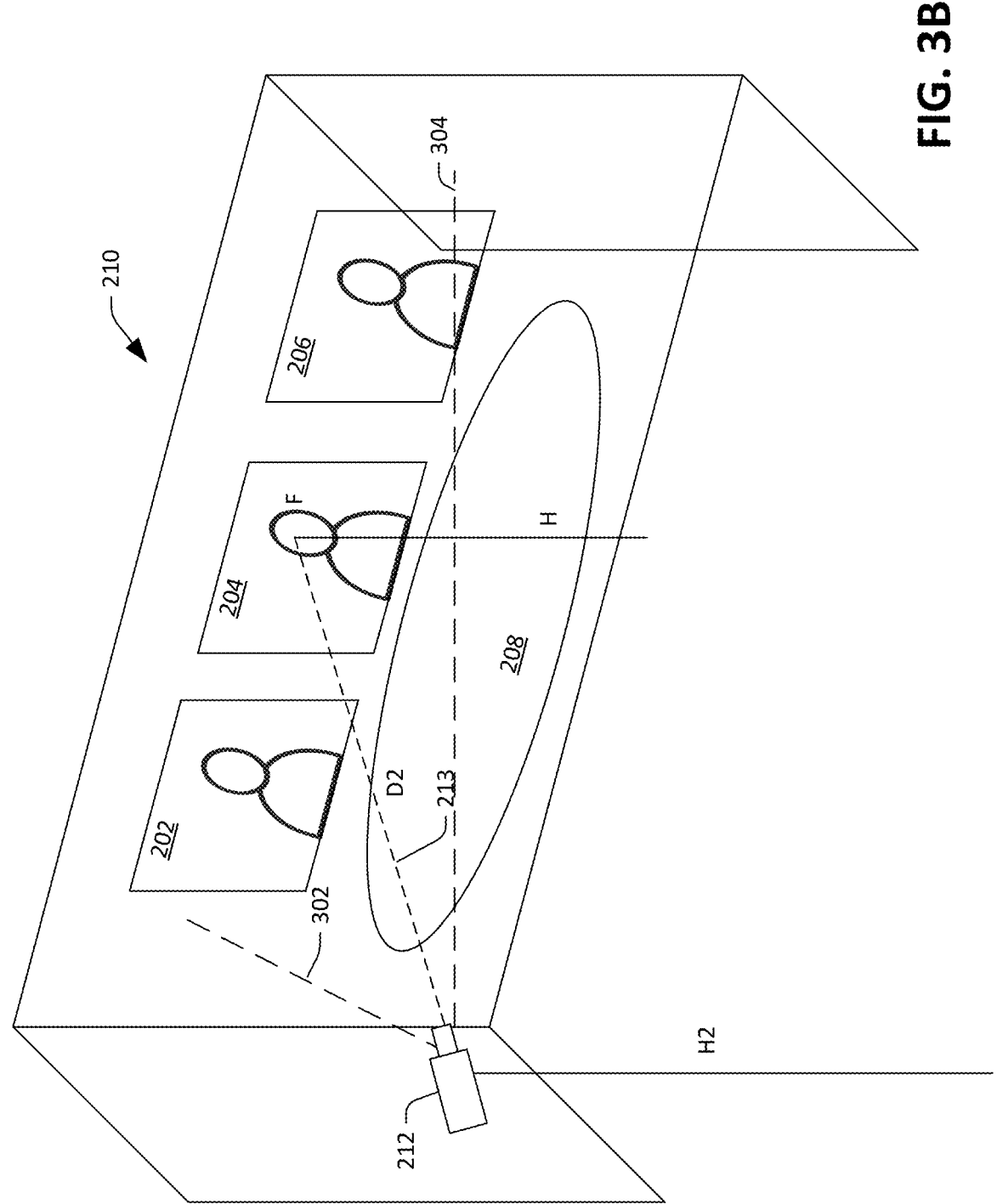
FIG. 3B illustrates a virtual camera and its position correlated to the exemplary 3D display view of FIG. 3A.

Referring now to FIG. 3B, a schematic that depicts position of the virtual camera 212 relative to graphical elements in the scene is illustrated, where an image captured by the virtual camera 212 when at such position results in the 3D display view 300. In the schematic of FIG. 3B, the virtual camera 212 is positioned at height H2 above ground in the scene 210, and where the focal point F of the virtual camera 212 remains held at height H above ground and continues to lie on graphical element 204. In addition, the optical axis 213 of the virtual camera 212 is no longer orthogonal to the surface of the graphical element 204, as the virtual camera 212 has been moved vertically upward. The focal plane of the virtual camera 212 is at distance D2 from the virtual camera 212, where D2 is greater than D due to movement of the virtual camera 212. The virtual camera 212 has a FOV represented by dashed lines 302 and 304, where the FOV of the virtual camera 212 depicted in FIG. 3B is more narrow than the FOV of the virtual camera 212 depicted in FIG. 2B, due to the display view generator component 116 altering the focal length of the virtual camera 212. The FOV of FIG. 3B continues to encompass the graphical elements 202-206 and the graphical feature 208. As indicated above, the display view generator component 116 generates the 3D view 300 by positioning the virtual camera 212 as illustrated in FIG. 3B relative to graphical elements in the virtual scene 210.

Returning again to FIG. 1, the display view generator component 116, when generating the transition between the 2D display view 200 and the 3D display view 300, effectively changes: 1) the position of the virtual camera 212 relative to the virtual scene 210 from the position shown in FIG. 2B to the position shown in FIG. 3B; and 2) the focal length of the virtual camera 212, wherein the focal length of the virtual camera 212 is altered as the position of the virtual camera 212 is altered such that size and position of a graphical element at the focal point of the virtual camera 212 does not change in images captured by the virtual camera 212. Put differently, and with reference to the examples shown in FIGS. 2B and 3B, as the distance increases from D to D2, the focal length of the virtual camera 212 likewise increases. This simultaneous alteration of distance and focal length causes size and position of the graphical element (e.g., graphical element 204) to remain static between the 2D display view 200 and the 3D display view 300 as the display view generator component 116 performs computations related transition between the views. An exemplary approach that can be undertaken by the display view generator component is to determine: 1) an initial position of the virtual camera 210; 2) an initial focal length of the virtual camera; 3) a final position of the virtual camera 210; and 4) a final focal length of the virtual camera, and interpolate between the initial position and final position and between the initial focal length and final focal length over several time steps. The display view generator component 116 can compute a view of the scene for each time step using the determined camera position and focal length values, resulting in a smooth transition from the 2D display view 200 to the 3D display view 300.

Continuing with the example shown in FIGS. 2A, 2B, 3A, and 3B, during the transition, the size and position of the graphical element 204 remains constant, while other parts of the scene change size and position around the graphical element 204. This creates a less visually jarring transition between the 2D display view 200 and the 3D display view 300. In some embodiments, the display view generator component 116 may utilize a standard virtual camera position change for a given transition and calculate the appropriate focal length adjustments to make for the transition in order to preserve positional information for the graphical representations 202-206.

An exemplary implementation of a transition between a 2D display view and 3D display view is expressed in the below exemplary pseudocode. It is appreciated that this code is offered by example only and is not limiting with respect to the various alternative embodiments discussed herein.

```
[Range(0, 1)]
public float s;
Vector3 startPosition = new Vector3(0, 0, -100);
Vector3 endPosition = new Vector3(0.3f, 5, -5);
void Update( )
{
   var camera = gameObject.GetComponent<Camera>( );
   var transform = gameObject.GetComponent<Transform>( );
   transform.position = (1 - s) * startPosition + s * endPosition;
   transform.LookAt(Vector3.zero, Vector3.up);
```

-continued

```
   // solve for fov from distance ( != z )
   float distance = Vector3.Distance(transform.position, Vector3.zero);
   float theta = 2 * Mathf.Atan(5.0f / distance);
   camera.fieldOfView = theta / Mathf.PI * 180; // degrees
}
```

From the foregoing, it can be ascertained that, when executing a transition from the 2D display view 200 to the 3D display view 300, the display view generator component 116 assigns or obtains positional information for graphical elements in the virtual scene 210. As noted above, the positional information may comprise the size and location of each graphical element within the virtual scene 210. In certain embodiments, the client video conference application 114 can support several different pre-generated scenes, and the display view generator component 116 can receive or assign positional information to graphical elements that represent online meeting participants based upon a scene selected by the user 102 and/or the display view generator component 116. Further, in some embodiments, the display view generator component 116 can receive input from the user 102 as to the final position of the virtual camera 212 relative to the scene 210. Thus, the user 102 can specify that the 3D display view 300 is to be "more" or "less" 3D, where the further the virtual camera 212 is moved vertically from the initial position the "more" 3D the 3D display view 300 will appear to the user 102. Still further, the display view generator component 116 can generate the transition between the 2D display view 200 and the 3D display view 300 based upon input from the user 102 as to speed of the transition.

Executing a transition from a 2D display view to a 3D display view may require that graphical elements change position within the display view so as to maintain spacing between the elements and/or prevent one element from occluding the view of another element. This movement can result in collision and/or occlusion of graphical elements within the display view during and/or after the transition. In some embodiments, the display view generator component 116 may utilize certain effects to visually enhance the transition from the 2D display view 200 to the 3D display view 300. In some embodiments, the display view generator component 116 may use alpha blending (also called alpha compositing) to render a graphical element opaque to avoid a collision and/or occlusion that may occur because of a transition. For example, if during the transition from the 2D display view 200 to the 3D display view 300 two graphical elements collide (e.g., a first graphical element representing a user collides with a second graphical element representing a conference table), either the first graphical element or the second graphical element may be made partially transparent during the transition and/or may remain transparent in the 3D display view 300. In another example, after a transition from the 2D display view 200 to the 3D display view 300 a first graphical element representing an object on a conference table may be occluding the view of a second graphical element representing a user. The first graphical element may be rendered opaque so that it does not block the second graphical element representing a user. In certain embodiments, 3D graphical elements such as the conference table in the above example may have one or more animations applied, such as, for example, the graphical element representing a conference table could be animated to sink into the ground and reappear after other graphical elements have been transitioned in the 3D display view 300. In certain embodiments, display view generator component 116 may recognize that a collision of graphical elements may occur during the transition between display views and perform animation that merely moves the graphical elements in order to avoid a collision during the transition.

It is appreciated that while the above examples relate to transitioning from a 2D display view to a 3D display view, display view generator component 116 may be further configured to execute similar transitions between a 3D display view to a 2D display view using similar techniques to those described above (e.g., moving the virtual camera 212 from the final position to the initial position while simultaneously decreasing focal length of the virtual camera 212).

Figure 4:
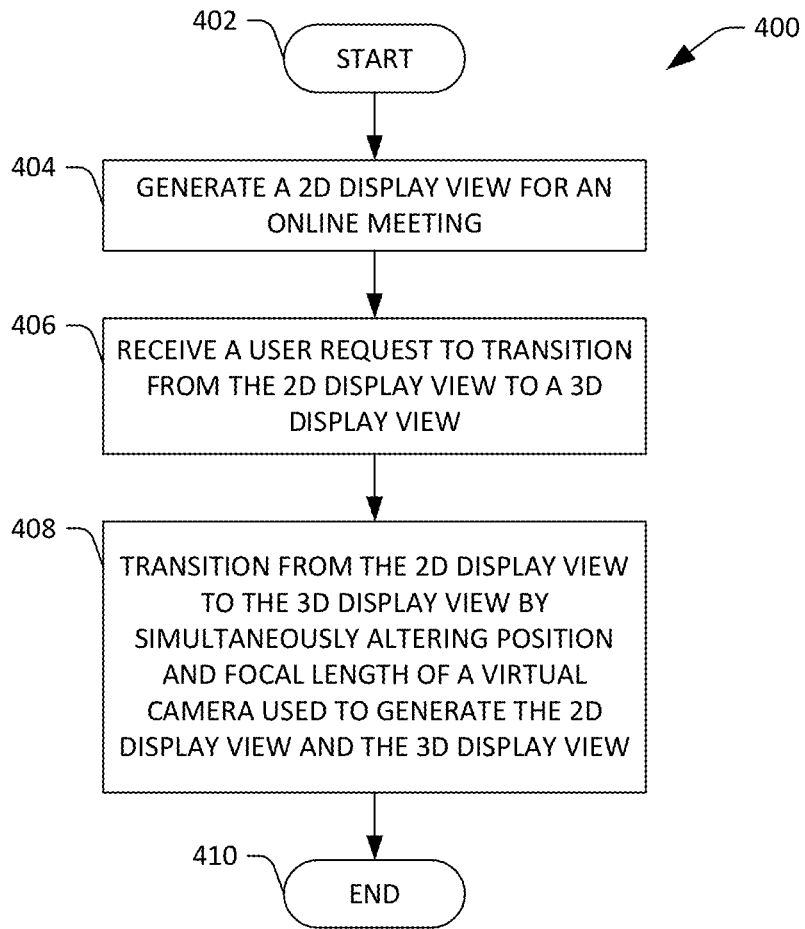
FIG. 4 illustrates an exemplary method for transitioning between display views during an online meeting conducted by way of a video conference application.

FIG. 4 illustrates an exemplary methodology 400 relating to transitioning from a 2D display view to a 3D display view during a video conference. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

The methodology 400 begins at step 402, and at 404, a 2D display view for an online meeting is presented on a display of a computing device of a user. The 2D display view includes several tiles that are representative of participants of the online meeting who are participating in the meeting with the user. In an example, the tiles can be arranged near a bottom of the display. Pursuant to an example, the 2D display view can be generated based upon: 1) positions of the tiles in a 3D scene; 2) a first position of a virtual camera relative to the tiles in the 3D scene; and 3) a first focal length of the virtual camera when the virtual camera is at the first position.

At step 406, a user request to transition from the 2D display view to a 3D display view is received. It is appreciated that the user request may be received by the client video conference application 114 and/or server video conference application 126.

At step 408, a transition between the 2D display view and the 3D display view is performed. In an example, the 3D display is generated based upon: 1) positions of the tiles in the 3D scene; 2) a second position of the virtual camera relative to the tiles in the 3D scene; and 3) a second focal length of the virtual camera when the virtual camera is at the second position. The transition between the 2D display view and the 3D display view is performed by simultaneously modifying the position of the virtual camera relative to the virtual scene (from the first position to the second position) and the focal length of the virtual camera (from the first focal length to the second focal length). The methodology 400 completes at 410.

Figure 5:
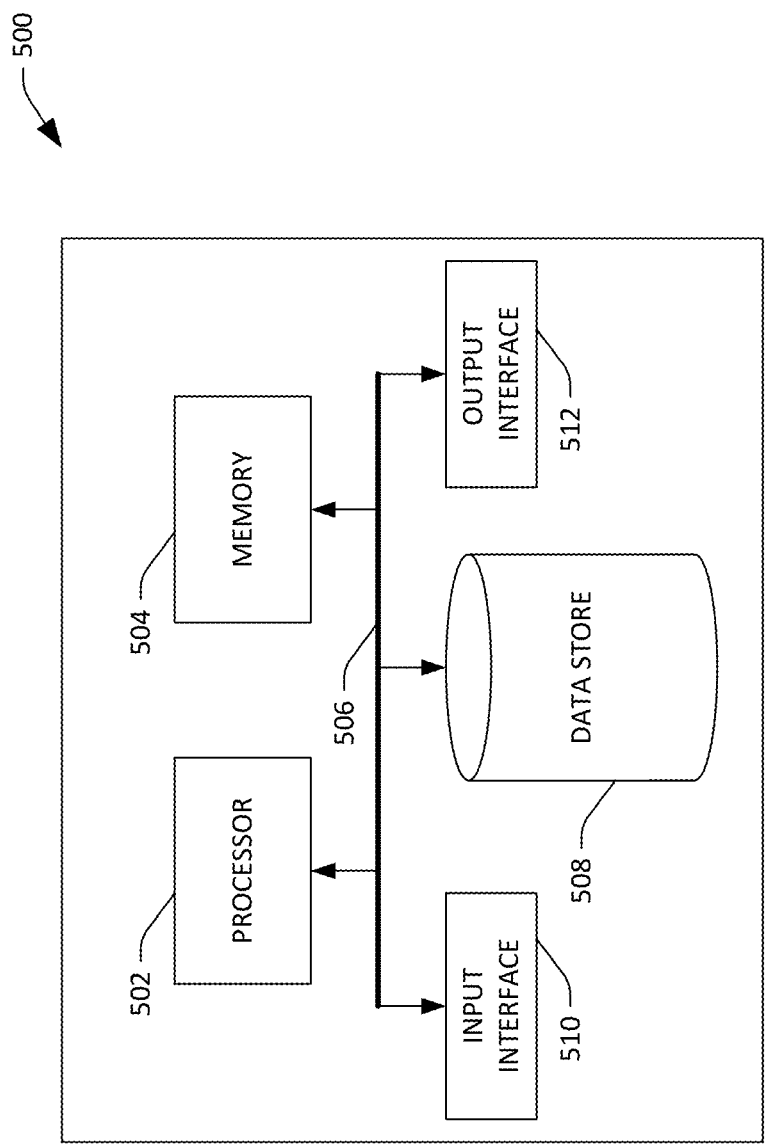
FIG. 5 illustrates an exemplary computing device.

Referring now to FIG. 5, a high-level illustration of an example computing device 500 that can be used in accordance with the systems and methodologies disclosed herein is illustrated. It is appreciated that user device 104 is one exemplary implementation of computing device 500. For instance, the computing device 500 may be used in a system that executes a transition between a 2D display view and a 3D display view in a video conference. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506.

The computing device 500 additionally includes a data store 508 that is accessible by the processor 502 by way of the system bus 506. The data store 508 may include executable instructions and 2D and 3D graphics related to video conferencing. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

The disclosure relates to transitioning between 2D views and 3D views in computer-implemented videoconferences according to at least the following examples.

(A1) In one aspect, some embodiments include a computer-implemented method for transitioning display views during an online meeting conducted by way of a computer-implemented video conference application. The method includes generating a two-dimensional (2D) display view for the online meeting, where the 2D display view is presented on a display of a user who is participating in the online meeting, where the 2D display view comprises graphical elements that represent other participants in the online meeting, and further where the 2D display view is generated based upon: 1) positions assigned to the graphical elements in a computer-implemented three-dimensional (3D)

scene; 2) a position of a virtual camera in the 3D scene; and 3) a focal length of the virtual camera when positioned at the first position. The method also includes receiving a request from the user to transition the 2D display view to a 3D display view, wherein the 3D display view is to replace the 2D display view on the display of the user subsequent to the transition being performed. The method also includes smoothly transitioning the 2D display view to the 3D display view, wherein smoothly transitioning the 2D display view to the 3D display view comprises simultaneously modifying the position of the virtual camera in the 3D scene and the focal length of the virtual camera over time.

(A2) In some embodiments of the method of (A1), the graphical elements include a graphical element that represents a participant in the online meeting. When the virtual camera is positioned at the position in the 3D scene, an optical axis of the virtual camera intersects the graphical element at a point on a surface of the graphical element. In addition, when the virtual camera is positioned at the position in the 3D scene, the optical axis is orthogonal the surface of the graphical element at the point on the surface where the optical axis.

(A3) In some embodiments of the method of (A2), simultaneously modifying the position of the virtual camera in the 3D scene and the focal length of the virtual camera over time includes increasing a distance between the virtual camera and the point on the surface of the graphical element while modifying orientation of the virtual camera such that the optical axis continues to intersect the graphical element at the point on the surface of the graphical element.

(A4) In some embodiments of the method of (A3), increasing the distance between the virtual camera and the point on the surface of the graphical element includes moving the virtual camera vertically in the 3D scene while maintaining position of the graphical element in the 3D scene.

(A5) In some embodiments of the method of (A3), simultaneously modifying the position of the virtual camera in the 3D scene and the focal length of the camera over time comprises increasing the focal length of the camera as the distance between the virtual camera and the point on the surface of the graphical element increases.

(A6) In some embodiments of the method of (A5), size and position of the graphical element remains constant during the transitioning from the 2D display view to the 3D display view.

(A7) In some embodiments of at least one of the methods of (A1)-(A6), the 3D display view is associated with a second position of the virtual camera in the 3D scene and a second focal length of the virtual camera when positioned at the second position. In addition, smoothly transitioning from the 2D display view to the 3D display view includes interpolating between the position of the virtual camera in the 3D scene and the second position of the virtual camera in the 3D scene over several time steps to generate a sequence of positions. Smoothly transitioning from the 2D display view to the 3D display view also includes interpolating between the focal length and the second focal length of the virtual camera over the several time steps to generate a sequence of focal lengths, wherein the transition from the 2D display view and the 3D display view is based upon the sequence of positions and the sequence of focal lengths.

(A8) In some embodiments of at least one of the methods of (A1)-(A7), the graphical elements include a first graphical element that represents a first participant and a second graphical element that represents a second participant, and smoothly transitioning from the 2D display view to the 3D display view further comprises rendering at least one of the first graphical element or the second graphical element as opaque during the transition from the 2D display view to the 3D display view.

(A9) In some embodiments of at least one of the methods of (A1)-(A8), the graphical elements are tiles that include video feeds of the participants.

(A10) In some embodiments of at least one of the methods of (A1)-(A10), the method is performed by a client computing device operated by the user.

(A11) In some embodiments of at least one of the methods of (A1)-(A11), the position of the virtual camera in the 3D scene and the focal length of the virtual camera are modified over time until the virtual camera is associated with a second position in the 3D scene and the virtual camera has a second focal length, and further wherein the second position and the second focal length are based upon input received from the user.

(B1) In another aspect, a method performed by a computing system that executes a video conference application is disclosed, where the method includes displaying a 2D display view in a graphical user interface (GUI) of the video conference application, wherein the 2D display view comprises a graphical element that represents a participant in an online meeting conducted by way of the video conference application. The graphical element is displayed in the 2D display view based upon: 1) a position of the graphical element in a three-dimensional (3D) scene; 2) a position of a virtual camera in the 3D scene; 3) an orientation of the virtual camera in the 3D scene when the virtual camera is at the position; and 4) a focal length of the virtual camera when the virtual camera is at the position, wherein the 2D display view is based upon a view of the virtual camera of the 3D scene when the virtual camera is at the position, has the orientation, and has the focal length. The method also includes receiving a request to transition the 2D display view to a 3D display view. The method further includes in response to receiving the request, transitioning the 2D display view to the 3D display view based upon several modifications of the position of the virtual camera in the 3D scene, the orientation of the virtual camera in the 3D scene, and the focal length of the virtual camera over several timesteps.

(B2) In some embodiments of the method of (B1), the position of the virtual camera in the 3D scene, the orientation of the virtual camera in the 3D scene, and the focal length of the virtual camera are simultaneously modified.

(B3) In some embodiments of the method of at least one of (B1)-(B2), the position of the virtual camera is modified such that distance between the virtual camera and the graphical element increases over the several timesteps.

(B4) In some embodiments of the method of (B3), the focal length of the virtual camera is modified such that the focal length increases over the several timesteps.

(B5) In some embodiments of the method of (B4), as the orientation of the virtual camera in the 3D scene is modified over the several timesteps, an optical axis of the virtual camera intersects a same point on the graphical element.

(B6) In some embodiments of the method of (B3), the position of virtual camera is modified by moving the virtual camera vertically in the 3D scene.

(B7) In some embodiments of at least one of the methods of (B1)-(B6), the transitioning of the 2D display view to the 3D display view is based upon views of the virtual camera of the 3D scene at the several timesteps.

(B8) In some embodiments of at least one of the methods of (B1)-(B7), size and position of the graphical element is held constant during the transition from the 2D display view to the 3D display view.

(C1) In another aspect, some embodiments include a computing system (e.g., 104) that includes a processor (e.g., 106) and memory (e.g., 108), where the memory stores instructions that, when executed by the processor, cause the processor to perform any of the methods described herein (e.g., any of (A1)-(A12) or (B1)-(B7)).

(D1) In yet another aspect, some embodiments include a computer-readable storage medium that includes instructions that, when executed by a processor, cause the processor to perform any of the methods described herein (e.g., any of (A1)-(A12) or (B1)-(B7)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Examples Pertaining to a Computing System that is Configured to

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for transitioning display views during an online meeting conducted by way of a computer-implemented video conference application, the method comprising:
    generating a two-dimensional (2D) display view for the online meeting, wherein the 2D display view is presented on a display of a user who is participating in the online meeting, and further wherein the 2D display view comprises graphical elements that represent other participants in the online meeting, and further wherein the 2D display view is generated based upon:
        positions assigned to the graphical elements in a computer-implemented three-dimensional (3D) scene;
        a position of a virtual camera in the 3D scene; and
        a focal length of the virtual camera when positioned at the first position;
    receiving a request from the user to transition the 2D display view to a 3D display view, wherein the 3D display view is to replace the 2D display view on the display of the user subsequent to the transition being performed; and
    smoothly transitioning the 2D display view to the 3D display view, wherein smoothly transitioning the 2D display view to the 3D display view comprises simultaneously modifying the position of the virtual camera in the 3D scene and the focal length of the virtual camera over time.

2. The method of claim 1, wherein the graphical elements include a graphical element that represents a participant in the online meeting, wherein when the virtual camera is positioned at the position in the 3D scene:
    an optical axis of the virtual camera intersects the graphical element at a point on a surface of the graphical element; and
    the optical axis is orthogonal the surface of the graphical element at the point on the surface where the optical axis intersects the graphical element.

3. The method of claim 2, wherein simultaneously modifying the position of the virtual camera in the 3D scene and the focal length of the virtual camera over time comprises increasing a distance between the virtual camera and the point on the surface of the graphical element while modifying orientation of the virtual camera such that the optical axis continues to intersect the graphical element at the point on the surface of the graphical element.

4. The method of claim 3, wherein increasing the distance between the virtual camera and the point on the surface of the graphical element comprises moving the virtual camera vertically in the 3D scene while maintaining position of the graphical element in the 3D scene.

5. The method of claim 3, wherein simultaneously modifying the position of the virtual camera in the 3D scene and the focal length of the camera over time comprises increasing the focal length of the camera as the distance between the virtual camera and the point on the surface of the graphical element increases.

6. The method of claim 5, wherein size and position of the graphical element remains constant during the transitioning from the 2D display view to the 3D display view.

7. The method of claim 1, wherein the 3D display view is associated with:
- a second position of the virtual camera in the 3D scene; and
- a second focal length of the virtual camera when positioned at the second position, and further wherein smoothly transitioning from the 2D display view to the 3D display view further comprises:
  - interpolating between the position of the virtual camera in the 3D scene and the second position of the virtual camera in the 3D scene over several time steps to generate a sequence of positions; and
  - interpolating between the focal length and the second focal length of the virtual camera over the several time steps to generate a sequence of focal lengths, wherein the transition from the 2D display view and the 3D display view is based upon the sequence of positions and the sequence of focal lengths.

8. The method of claim 1, wherein the graphical elements include a first graphical element that represents a first participant and a second graphical element that represents a second participant, and further wherein smoothly transitioning from the 2D display view to the 3D display view further comprises rendering at least one of the first graphical element or the second graphical element as opaque during the transition from the 2D display view to the 3D display view.

9. The method of claim 1, wherein the graphical elements are tiles that include video feeds of the participants.

10. The method of claim 1 performed by a client computing device operated by the user.

11. The method of claim 1, wherein the position of the virtual camera in the 3D scene and the focal length of the virtual camera are modified over time until the virtual camera is associated with a second position in the 3D scene and the virtual camera has a second focal length, and further wherein the second position and the second focal length are based upon input received from the user.

12. A computing system comprising:
a processor; and
memory storing a video conference application, wherein the video conference application, when executed by the processor, causes the processor to perform acts comprising:
  displaying a 2D display view in a graphical user interface (GUI) of the video conference application, wherein the 2D display view comprises a graphical element that represents a participant in an online meeting conducted by way of the video conference application, wherein the graphical element is displayed in the 2D display view based upon:
    a position of the graphical element in a three-dimensional (3D) scene;
    a position of a virtual camera in the 3D scene;
    an orientation of the virtual camera in the 3D scene when the virtual camera is at the position; and
    a focal length of the virtual camera when the virtual camera is at the position, wherein the 2D display view is based upon a view of the virtual camera of the 3D scene when the virtual camera is at the position, has the orientation, and has the focal length;
  receiving a request to transition the 2D display view to a 3D display view; and
  in response to receiving the request, transitioning the 2D display view to the 3D display view based upon several modifications of the position of the virtual camera in the 3D scene, the orientation of the virtual camera in the 3D scene, and the focal length of the virtual camera over several timesteps.

13. The computing system of claim 12, wherein the position of the virtual camera in the 3D scene, the orientation of the virtual camera in the 3D scene, and the focal length of the virtual camera are simultaneously modified.

14. The computing system of claim 12, wherein the position of the virtual camera is modified such that distance between the virtual camera and the graphical element increases over the several timesteps.

15. The computing system of claim 14, wherein the focal length of the virtual camera is modified such that the focal length increases over the several timesteps.

16. The computing system of claim 15, wherein as the orientation of the virtual camera in the 3D scene is modified over the several timesteps, an optical axis of the virtual camera intersects a same point on the graphical element.

17. The computing system of claim 14, wherein the position of virtual camera is modified by moving the virtual camera vertically in the 3D scene.

18. The computing system of claim 12, wherein the transitioning of the 2D display view to the 3D display view is based upon views of the virtual camera of the 3D scene at the several timesteps.

19. The computing system of claim 12, wherein size and position of the graphical element is held constant during the transition from the 2D display view to the 3D display view.

20. A computer-readable storage medium comprising instructions that, when executed by a processor, cause the processor to perform acts comprising:
  generating a two-dimensional (2D) display view for an online meeting conducted by way of a computer-implemented video conference application, wherein the 2D display view is presented on a display of a user who is participating in the online meeting, and further wherein the 2D display view comprises graphical elements that represent other participants in the online meeting, and further wherein the 2D display view is generated based upon:
    positions assigned to the graphical elements in a computer-implemented three-dimensional (3D) scene;
    a position of a virtual camera in the 3D scene; and
    a focal length of the virtual camera when positioned at the first position;
  receiving a request from the user to transition the 2D display view to a 3D display view, wherein the 3D display view is to replace the 2D display view on the display of the user subsequent to the transition being performed; and
  smoothly transitioning the 2D display view to the 3D display view, wherein smoothly transitioning the 2D display view to the 3D display view comprises simultaneously modifying the position of the virtual camera in the 3D scene and the focal length of the virtual camera over time.

\* \* \* \* \*